(12) United States Patent
Kaga

(10) Patent No.: US 12,078,873 B2
(45) Date of Patent: Sep. 3, 2024

(54) METHOD FOR DESIGNING PROGRESSIVE ADDITION LENS, SYSTEM FOR DESIGNING PROGRESSIVE ADDITION LENS, AND PROGRESSIVE ADDITION LENS GROUP

(71) Applicant: HOYA LENS THAILAND LTD., Pathumthani (TH)

(72) Inventor: Tadashi Kaga, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 413 days.

(21) Appl. No.: 17/609,992

(22) PCT Filed: Sep. 1, 2020

(86) PCT No.: PCT/JP2020/033021
§ 371 (c)(1),
(2) Date: Nov. 9, 2021

(87) PCT Pub. No.: WO2021/059886
PCT Pub. Date: Apr. 1, 2021

(65) Prior Publication Data
US 2022/0206319 A1 Jun. 30, 2022

(30) Foreign Application Priority Data
Sep. 25, 2019 (JP) .................. 2019-174130

(51) Int. Cl.
G02C 7/06 (2006.01)
G02C 7/02 (2006.01)
(52) U.S. Cl.
CPC ............. *G02C 7/061* (2013.01); *G02C 7/024* (2013.01)
(58) Field of Classification Search
CPC ........ G02C 7/061; G02C 7/024; G02C 7/027; G02C 7/065; G02C 7/06; G02C 7/028;
(Continued)

(56) References Cited

U.S. PATENT DOCUMENTS

2001/0031607 A1  10/2001  Shirayanagi
2006/0209255 A1*  9/2006  Donetti ................. G02C 7/061
                                                                351/159.76
(Continued)

FOREIGN PATENT DOCUMENTS

DE   102017000777 A1   8/2018
EP        3457195 A1 *  3/2019  ............ G02C 7/024
(Continued)

OTHER PUBLICATIONS

Machine translation of JP 2005201993 A (Year: 2005).*
(Continued)

*Primary Examiner* — Darryl J Collins
*Assistant Examiner* — Matthew Y Lee
(74) *Attorney, Agent, or Firm* — Oliff PLC

(57) ABSTRACT

A method for designing a progressive addition lens and the related technology, the lens including a near portion for viewing a near distance, a distance portion for viewing a farther distance, and an intermediate portion between the near and distance portions and having a progressive refraction function, wherein transmission astigmatism is added to the near and intermediate portions out of the distance portion, the near portion, and the intermediate portion, the method including a mode selection step of determining, according to a prescription power, whether to select an AS-oriented mode wherein the amount of transmission astigmatism to be added is set so the amount of horizontal refractive power is larger than the vertical refractive power, or select a PW-oriented mode in which the amount of transmission astigmatism to be added is set so the amount of vertical refractive power is larger than the horizontal refractive power.

3 Claims, 5 Drawing Sheets

(58) Field of Classification Search
CPC .......... G02C 7/02; G02C 7/041; G02C 7/063;
G02C 7/042; G02C 7/043; G02C 7/044;
G02C 7/045; G02C 7/022
USPC .......................... 351/159.73–159.74, 159.77
See application file for complete search history.

(56) References Cited

U.S. PATENT DOCUMENTS

| | | | | |
|---|---|---|---|---|
| 2014/0146283 | A1* | 5/2014 | Shinohara | G02C 7/063 |
| | | | | 351/159.42 |
| 2019/0278079 | A1 | 9/2019 | McCabe | |
| 2020/0249500 | A1 | 8/2020 | Asami et al. | |
| 2023/0333408 | A1* | 10/2023 | Welk | G02C 7/061 |

FOREIGN PATENT DOCUMENTS

| | | | | |
|---|---|---|---|---|
| JP | 2002-122824 | A | | 4/2002 |
| JP | 2005201993 | A * | 7/2005 | ............... G02C 7/06 |
| JP | 2014-106385 | A | | 6/2014 |
| WO | 2019/059410 | A1 | | 3/2019 |

OTHER PUBLICATIONS

Nov. 24, 2020 International Search Report issued in International Patent Application No. PCT/JP2020/033021.

Mar. 15, 2022 International Preliminary Report on Patentability issued in Patent Application No. PCT/JP2020/033021.

Sep. 22, 2023 Search Report issued in European Patent Application No. 20867571.0.

* cited by examiner

– 1 –

METHOD FOR DESIGNING PROGRESSIVE ADDITION LENS, SYSTEM FOR DESIGNING PROGRESSIVE ADDITION LENS, AND PROGRESSIVE ADDITION LENS GROUP

TECHNICAL FIELD

The present invention relates to a method for designing a progressive addition lens, a system for designing a progressive addition lens, and a progressive addition lens group.

BACKGROUND ART

Patent Document 1 discloses a progressive addition lens provided with a near portion for viewing a near distance, a distance portion for viewing a distance farther than the near distance, and an intermediate portion provided between the near portion and the distance portion and having a progressive refraction function.

It is also disclosed that, in this progressive addition lens, transmission astigmatism is added to the near portion and the intermediate portion out of the distance portion, the near portion, and the intermediate portion (claims 2 and 7).

It is also disclosed that the amount of transmission astigmatism to be added is set such that the amount of horizontal refractive power is larger than the amount of vertical refractive power (claim 2 and Embodiment 1 in Patent Document 1). Setting the amount of transmission astigmatism to be added in this manner is also referred to as an "AS-oriented mode". Due to this setting, clear visual field ranges of the intermediate portion and the near portion are larger compared to a conventional design (e.g., [0108]). A clear visual field range can be determined using a transmission astigmatism distribution, and thus the aforementioned setting is referred to as an "AS-oriented mode" in the present specification.

It is also disclosed that the amount of transmission astigmatism to be added is set such that the amount of vertical refractive power is larger than the amount of horizontal refractive power (claim 7 and Embodiment 2 in Patent Document 1). Setting the amount of transmission astigmatism to be added in this manner is also referred to as a "PW-oriented mode". Due to this setting, the horizontal width of the near portion having an average refractive power that is more than or equal to the average refractive power is larger compared to a conventional design (e.g., [0165]). Furthermore, skew distortion is also smaller compared to a conventional design (e.g., [0186] to [0194]). These effects are obtained due to a transmission average refractive power distribution, and thus the aforementioned setting is referred to as a "PW-oriented mode" in this specification.

CITATION LIST

Patent Documents

Patent Document 1; EP 3,457,195A1

SUMMARY OF INVENTION

Technical Problem

Patent Document 1 only discloses the AS-oriented mode and the PW-oriented mode, and no studies were conducted on which mode is to be adopted for a wearer.

In view of this, an embodiment of the present invention aims to select an appropriate mode according for a wearer and provide a progressive addition lens to which transmission astigmatism is added based on this mode.

Solution to Problem

A first aspect of the present invention is directed to a method for designing a progressive addition lens, the progressive addition lens including a near portion for viewing a near distance; a distance portion for viewing a distance farther than the near distance; and an intermediate portion provided between the near portion and the distance portion and having a progressive refraction function, in which transmission astigmatism is added to the near portion and the intermediate portion out of the distance portion, the near portion, and the intermediate portion, the method comprising: a mode selection step of determining, according to a prescription power, whether to select an AS-oriented mode in which the amount of transmission astigmatism to be added is set such that the amount of horizontal refractive power is larger than the amount of vertical refractive power, or select a PW-oriented mode in which the amount of transmission astigmatism to be added is set such that the amount of vertical refractive power is larger than the amount of horizontal refractive power.

A second aspect of the present invention is directed to the method according to the first aspect, in which in the mode selection step, in a case where the prescription power is lower than a predetermined value, the AS-oriented mode is selected, and in a case where the prescription power is higher than the predetermined value, the PW-oriented mode is selected.

A third aspect of the present invention is directed to the method according to the second aspect, in which the mode selection step is performed based on a plot obtained when the prescription power [D] is shown on a horizontal axis X (a positive direction indicates positive power and a negative direction indicates negative power), the amount of transmission astigmatism added [D] is shown on a vertical axis Y (a positive direction indicates the amount of transmission astigmatism obtained when the amount of horizontal refractive power is larger than the amount of vertical refractive power, and a negative direction indicates the amount of transmission astigmatism obtained when the amount of vertical refractive power is larger than the amount of horizontal refractive power), and the origin is set such that the prescription power is zero and the amount of transmission astigmatism added is zero, on the plot, in a case where the prescription power deviates from a predetermined range that includes the predetermined value in the negative direction, the AS-oriented mode is selected and the amount of transmission astigmatism is kept constant in the positive direction, in a case where the prescription power deviates from the predetermined range that includes the predetermined value in the positive direction, the PW-oriented mode is selected and the amount of transmission astigmatism is kept constant in the negative direction, and in a case where the prescription power is within the predetermined range that includes the predetermined value, Y is set to zero (Y=0) when the prescription power has the predetermined value and the prescription power continuously changes with respect to the plot that is deviated from the predetermined range.

A fourth aspect of the present invention is directed to the method according to the third aspect, in which the prescription power is a near power obtained by adding an addition power to a distance power, the predetermined value is zero, and the predetermined range is a region extending from a range of ±0.25 D to a range of ±1.25 D centered on the predetermined value.

A fifth aspect of the present invention is directed to a system for designing a progressive addition lens, the progressive addition lens including: a near portion for viewing a near distance; a distance portion for viewing a distance farther than the near distance; and an intermediate portion provided between the near portion and the distance portion and having a progressive refraction function, in which transmission astigmatism is added to the near portion and the intermediate portion out of the distance portion, the near portion, and the intermediate portion, the system comprising: a mode selection unit configured to determine, according to a prescription power, whether to select an AS-oriented mode in which the amount of transmission astigmatism to be added is set such that the amount of horizontal refractive power is larger than the amount of vertical refractive power, or select a PW-oriented mode in which the amount of transmission astigmatism to be added is set such that the amount of vertical refractive power is larger than the amount of horizontal refractive power.

A sixth aspect of the present invention is directed to a progressive addition lens group, the progressive addition lens group including: a near portion for viewing a near distance; a distance portion for viewing a distance farther than the near distance; and an intermediate portion provided between the near portion and the distance portion and having a progressive refraction function, in which transmission astigmatism is added to the near portion and the intermediate portion out of the distance portion, the near portion, and the intermediate portion, and according to a prescription power, the amount of transmission astigmatism to be added is set such that the amount of horizontal refractive power is larger than the amount of vertical refractive power, and the amount of transmission astigmatism to be added is set such that the amount of vertical refractive power is larger than the amount of horizontal refractive power.

According to another aspect of the present invention, the prescription power is a distance power or a near power obtained by adding an addition power to the distance power.

According to another aspect of the present invention, the predetermined value is zero.

According to another aspect of the present invention, the predetermined range is a region extending from a range of ±0.25 D to a range of ±1.25 D centered on the predetermined value.

According to another aspect of the present invention, transmission astigmatism having an absolute value of more than zero and 0.25 D or less is added to the near portion and the intermediate portion.

According to another aspect of the present invention, an absolute value of the value of the transmission astigmatism at a measurement reference point F of the distance portion after subtracting the refractive power for astigmatism correction is 0.12 D or less.

According to another aspect of the present invention, the amount of an absolute value of a change amount Δ[D] from a value of transmission astigmatism at the measurement reference point F of the distance portion to a value of transmission astigmatism at a measurement reference point N of the near portion is 0.07 to 0.24 times an addition power ADD [D].

According to another aspect of the present invention, the transmission refractive power is added together with the transmission astigmatism.

The addition power is preferably 1.5 to 3.0 D.

When the lens is viewed from top to bottom, it is preferable that the amount of transmission astigmatism added is not reduced once the addition of the transmission astigmatism has started.

In addition, when the lens is viewed from top to bottom, in a portion at least from the progressive start point to the measurement reference point N (in the case of meridian, up to an intersecting horizontal line), it is preferable that the additional amount increases monotonically once the addition of the transmission astigmatism has started, and the monotonously increased additional amount does not decrease or is 10% or less of the additional amount or is 0.12 D or less even if the monotonously increased additional amount decreases.

Advantageous Effects of Invention

According to an embodiment of the present invention, it is possible to select an appropriate mode according for a wearer and provide a progressive addition lens to which transmission astigmatism is added based on the selected mode.

DESCRIPTION OF EMBODIMENTS

Figure 1:
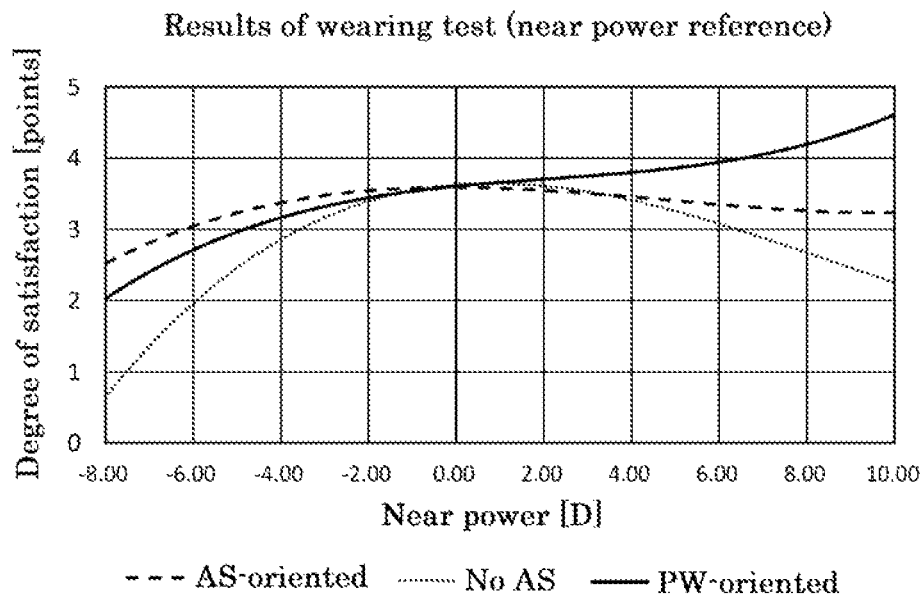
FIG. 1 is a diagram showing, using a regression curve, the results of opinions heard from a wearer where the near power [D] is shown on a horizontal axis X (the positive direction indicates positive power and the negative direction indicates negative power), the degree of satisfaction is shown on a vertical axis Y, addition power ADD is 2.00 D, and the amount of transmission astigmatism added is set to 0.18 D in the AS-oriented mode and to −0.25 D in the PW-oriented mode.

As described in Patent Document 1, one of the reasons for the creation of the technical idea of the present invention is that it overturns common sense and intentionally adds transmission astigmatism to a place where a spectacle wearer frequently moves their line of sight through. The portion is an intermediate portion and a near portion. Note that transmission astigmatism is not added to a distance portion. More precisely, the transmission astigmatism is not added to a fitting point or an eye point FP existing at least in the distance portion. Note that all definitions of the terms in the present specification can be referred to in the description in Patent Document 1.

By adding transmission astigmatism in the AS-oriented mode, that is, such that the amount of horizontal refractive power is larger than the amount of vertical refractive power in the added transmission astigmatism, obviously, the transmission astigmatism is increased at the meridian and the measurement reference point N. However, a sharp change in the transmission astigmatism is mitigated in the entire intermediate portion and near portion. Also, as a result, a clear visual field range where the transmission astigmatism is 0.50 D or less (after refractive power for astigmatism correction is subtracted) can be acquired.

On the other hand, by adding transmission astigmatism in the PW-oriented mode, that is, such that the amount of vertical refractive power is larger than the amount of horizontal refractive power in the added transmission astigmatism, the horizontal width of an area of the near portion that is larger than or equal to the predetermined power (i.e., near power, that is, half of (distance power+addition power)) can be increased as compared with the conventional case. The predetermined power may be set to half of (distance power+ addition power) or within ±0.25 D which is half of (distance power+addition power). The distance power is also referred to as spherical power, and may be denoted by symbol S.

Opinions regarding how the wearer felt about the progressive addition lens to which the transmission astigmatism was added were obtained in this manner. As a result, the inventor of the present invention found that there is a causal relationship between the progressive addition lens produced by selecting the AS-oriented mode or the PW-oriented mode with respect to the prescription power of the wearer and the degree of satisfaction of the wearer.

A configuration that has been conceived based on the above-described findings is as follows.

"A method for designing a progressive addition lens that includes a near portion for viewing a near distance, a distance portion for viewing a distance farther than the near distance, and an intermediate portion provided between the near portion and the distance portion and having a progressive refraction function, in which transmission astigmatism is added to the near portion and the intermediate portion out of the distance portion, the near portion, and the intermediate portion, the method including a mode selection step of determining, according to a prescription power, whether to select an AS-oriented mode in which the amount of transmission astigmatism to be added is set such that the amount of horizontal refractive power is larger than the amount of vertical refractive power, or select a PW-oriented mode in which the amount of transmission astigmatism to be added is set such that the amount of vertical refractive power is larger than the amount of horizontal refractive power."

There is no particular limitation on the "prescription power" here, and the prescription power is a distance power or a near power obtained by adding an addition power to a distance power, for example.

According to an embodiment of the present invention, it is possible to select an appropriate mode according for a wearer and provide a progressive addition lens to which transmission astigmatism is added based on the selected mode.

Note that it is preferable to adopt the following aspects.

In the mode selection step, in a case where the prescription power is lower than a predetermined value, the AS-oriented mode is selected, and in a case where the prescription power is higher than the predetermined value, the PW-oriented mode is selected.

Specifically, the findings found by the inventor of the present invention are as follows. Note that, while the following findings are obtained as a result of the inventor of the present invention hearing the opinions of the wearer, the technical idea of the present invention is not limited to specific cases leading to the following findings.

First, a total of 50 or more wearers were prepared. Also, the near power obtained by adding the addition power ADD to the distance power S was obtained as the prescription power required to correct the eyesight of a wearer. Also, a progressive addition lens to which transmission astigmatism was not added, a progressive addition lens to which the AS-oriented mode was applied and transmission astigmatism was added, and a progressive addition lens to which the PW-oriented mode was applied and transmission astigmatism was added were worn by a wearer. The wearers were asked to score the degree of satisfaction while wearing each lens from 1 to 5 points.

FIG. 1 is a diagram showing, using a regression curve, the results of opinions heard from a wearer where the near power [D] is shown on the horizontal axis X (the positive direction indicates positive power and the negative direction indicates negative power), the degree of satisfaction is shown on the vertical axis Y, the addition power ADD is 2.00

D, and the amount of transmission astigmatism added is set to 0.18 D in the AS-oriented mode and to −0.25 D in the PW-oriented mode.

When looking at FIG. 1, in the PW-oriented mode, when the near power is less than zero(=the predetermined value), the degree of satisfaction is likely to decrease, and when the near power exceeds zero(=the predetermined value), the degree of satisfaction is likely to increase.

Figure 2:
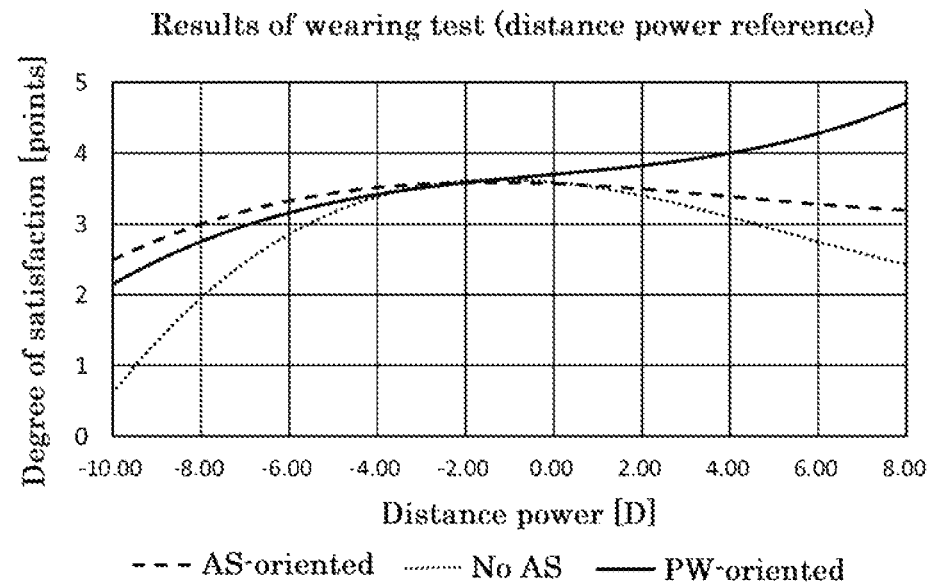
FIG. 2 is a diagram showing, using a regression curve, the results of opinions heard from a wearer where the distance power S [D] is shown on the horizontal axis X (the positive direction indicates positive power and the negative direction indicates negative power), the degree of satisfaction is shown on the vertical axis Y, addition power ADD is 2.00 D, and the amount of transmission astigmatism added is set to 0.18 D in the AS-oriented mode and to −0.25 D in the PW-oriented mode.

FIG. 2 is a diagram showing, using a regression curve, the results of opinions heard from a wearer where the distance power S [D] is shown on the horizontal axis X (the positive direction indicates positive power and the negative direction indicates negative power), the degree of satisfaction is shown on the vertical axis Y, the addition power ADD is 2.00 D, and the amount of transmission astigmatism added is set to 0.18 D in the AS-oriented mode and to −0.25 D in the PW-oriented mode.

Looking at FIG. 2 as well, the same trend as that in FIG. 1 can be seen. That is, in the PW-oriented mode, when the distance power is less than −2.00 D(=the predetermined value), the degree of satisfaction is likely to decrease, and when the distance power exceeds −2.00 D(=the predetermined value), the degree of satisfaction is likely to increase.

The inventor of the present invention regarded this trend as being important and found that it is effective to adopt the PW-oriented mode when the near power of a wearer exceeds zero(=the predetermined value). On the other hand, it was found that the AS-oriented mode with which the degree of satisfaction does not decrease as much as the PW-oriented mode is to be adopted when the near power of a wearer is less than zero(=the predetermined value).

Figure 3:
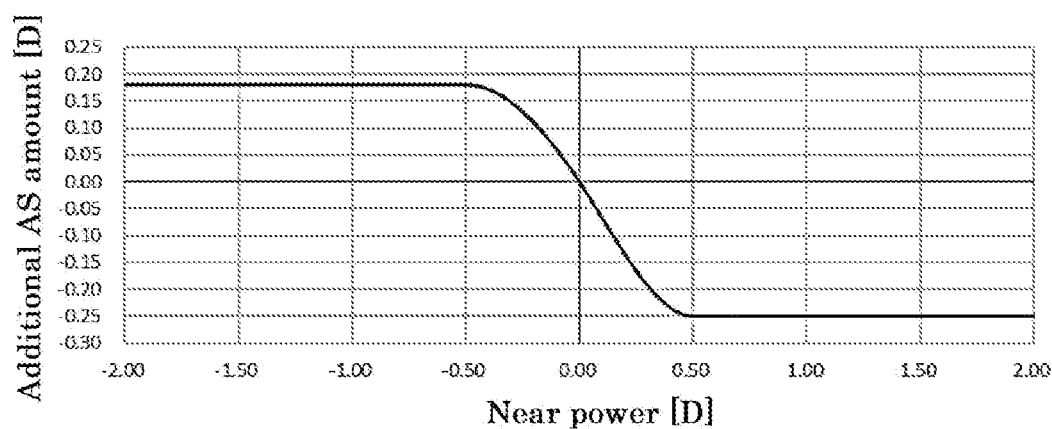
FIG. 3 is a plot used in a mode selection step when a power (i.e., the near power) obtained by adding the addition power to the distance power is adopted as a prescription power, and a predetermined value is set to zero in the present embodiment.

Furthermore, based on the results of the above-described opinion hearing, it was found that, if the near power is within the predetermined range that includes zero (within a range of ±0.50 D centered on zero, that is, within the so-called low power range in FIG. 3), the degree of satisfaction can be improved by changing the absolute value of the amount of added transmission astigmatism according to the value of near power instead of uniformly adding transmission astigmatism. Specifically, it was found that the closer the value of near power is to zero, the closer the absolute value of the amount of added transmission astigmatism is to zero.

FIG. 3 is a plot used in the mode selection step when a power (i.e., the near power) obtained by adding the addition power to the distance power is adopted as a prescription power, and the predetermined value is set to zero in the present embodiment.

Note that the origin of the plot in FIG. 3 refers to a progressive addition lens with a distance power S of −2.00 D and an addition power ADD of 2.00 D, that is, a near power (S+ADD) of zero. The progressive addition lens that is applicable to this plot may be a lens in which the addition power ADD is fixed at 2.00 D and the distance power S has a variation, a lens in which the distance power S is fixed at −2.00 D and the addition power ADD has a variation, or a lens in which both the distance power S and the addition power ADD have variations.

The format of this plot is as follows.

A prescription power [D] is shown on the horizontal axis X (the positive direction indicates positive power and the negative direction indicates negative power), the amount of transmission astigmatism added [D] is shown on the vertical axis Y (the positive direction indicates the amount of transmission astigmatism obtained when the amount of horizontal refractive power is larger than the amount of vertical refractive power, and the negative direction indicates the amount of transmission astigmatism obtained when the amount of vertical refractive power is larger than the amount of horizontal refractive power), and the origin is set such that the prescription power is zero and the amount of transmission astigmatism added is zero. The amount of transmission astigmatism to be added is also referred to as "additional AS amount".

Hereinafter, although the same format is adopted for this plot, the present invention is not limited to this format.

Figure 4:
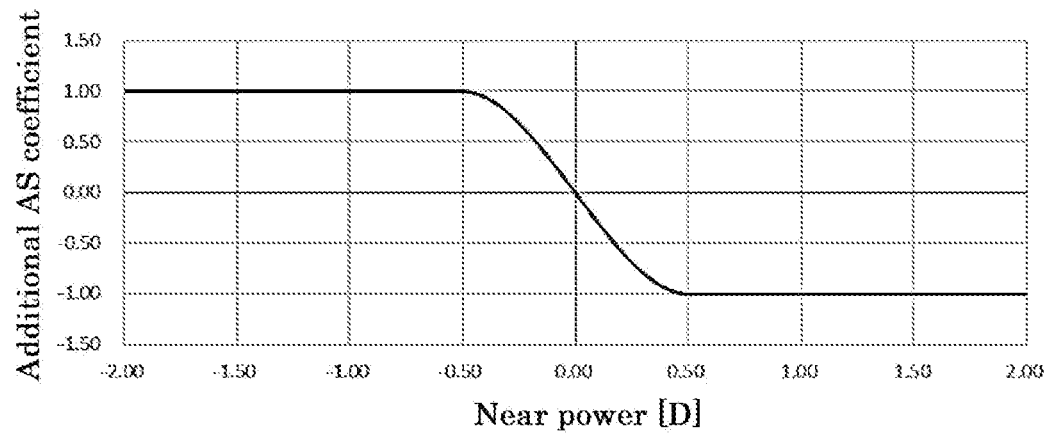
FIG. 4 is a plot that is obtained as a result of, if the prescription power deviates from the predetermined range that includes the predetermined value in the negative direction in FIG. 3, the AS-oriented mode being selected and the amount of transmission astigmatism added that is kept constant in the positive direction being normalized to 1, and if the prescription power deviates from the predetermined range that includes the predetermined value in the positive direction, the PW-oriented mode being selected and the amount of transmission astigmatism added that is kept constant in the negative direction being normalized to −1.

FIG. 4 is a plot that is obtained as a result of, if the prescription power deviates from the predetermined range that includes the predetermined value in the negative direction in FIG. 3, the AS-oriented mode being selected and the amount of transmission astigmatism added that is kept constant in the positive direction being normalized to 1, and if the prescription power deviates from the predetermined range that includes the predetermined value in the positive direction, the PW-oriented mode being selected and the amount of transmission astigmatism added that is kept constant in the negative direction being normalized to −1. Therefore, the unit of the vertical axis is the additional AS coefficient.

Figure 5:
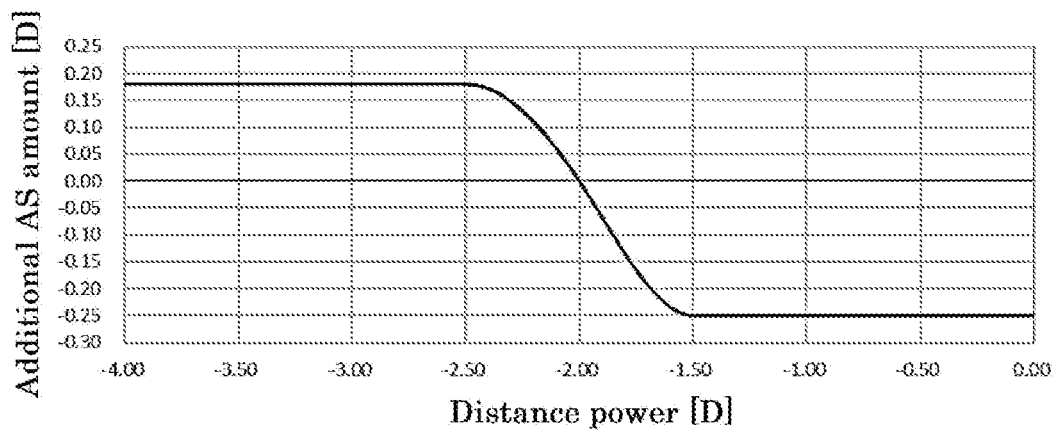
FIG. 5 is a plot used in the mode selection step when the distance power is adopted as a prescription power, and the predetermined value is set to −2.00 D in the present embodiment.

FIG. 5 is a plot used in the mode selection step when the distance power is adopted as a prescription power, and the predetermined value is set to −2.00 D in the present embodiment.

When the prescription power is lower than the predetermined value, that is, when the performance of a concave lens is high, light rays pass through the lens and are focused on the retina of a wearer, and an image recognized by the wearer is displayed at a smaller size than that of the actual object. In this case, even if shaking and distortion occur due to transmission astigmatism, the visually recognized image is displayed at a slightly reduced size, which is relatively unnoticeable to the wearer. In this case, it is advisable to focus on increasing the visual field rather than dealing with shaking and distortion.

As a result, the inventor of the present invention arrived at the idea to provide a wearer with a progressive addition lens to which the AS-oriented mode is adopted when the prescription power is lower than the predetermined value. As a result of the aforementioned provision, it is possible to obtain high degrees of satisfaction.

When the prescription power is higher than the predetermined value, that is, when the performance of a convex lens is high, light rays pass through the lens and are focused on the retina of a wearer, and an image recognized by the wearer is displayed at a larger size than that of the actual object. In this case, if shaking and distortion occurs due to transmission astigmatism, the shaking and distortion are relatively noticeable to the wearer. In that case, it is advisable to deal with shaking and distortion. It is effective to adopt the aspect of Embodiment 2 in Patent Document 1, that is, the PW-oriented mode, in order to deal with shaking and distortion (in particular, dealing with skew distortion, FIGS. 11 and 12). This is described in (Embodiment 2) in Patent Document 1.

As a result, the inventor of the present invention arrived at the idea to provide a wearer with a progressive addition lens to which the PW-oriented mode is adopted when the prescription power is higher than the predetermined value. As a result of the aforementioned provision, it is possible to obtain high degrees of satisfaction.

Note that a specific "predetermined value" changes depending on what is selected as the prescription power. If a power obtained by adding the addition power to the distance power (that is, near power) is selected as the prescription power, for example, the predetermined value may be zero.

If the distance power is selected as the prescription power, the predetermined value may deviate from zero. The predetermined value may be set to a range of −0.40 D or more and zero or less, for example.

Also, if the prescription power is equal to the predetermined value, transmission astigmatism need not be added. If the near power is selected as the prescription power and the predetermined value is set to zero, for example, and if the distance power+the addition power as the prescription power is zero, it means that the near portion is a substantially spherical surface, and in the first place, the transmission astigmatism is close to zero. Obviously, even in this case, transmission astigmatism may be added, but there is no specific need to add the transmission astigmatism.

As shown in FIG. 3, a plot used in the mode selection step is preferably set as follows.

[Setting 1] In a case where the prescription power deviates from the predetermined range that includes the predetermined value in the negative direction, the AS-oriented mode is selected and the amount of transmission astigmatism added is kept constant in the positive direction.

[Setting 2] In a case where the prescription power deviates from the predetermined range that includes the predetermined value in the positive direction, the PW-oriented mode is selected and the amount of transmission astigmatism added is kept constant in the negative direction.

[Setting 3] In a case where the prescription power is within the predetermined range that includes the predetermined value, Y is set to zero (Y=0) when the prescription power has the predetermined value and the prescription power continuously changes with respect to the plot that is deviated from the predetermined range.

With regard to [Setting 1], if the prescription power is somewhat set on the negative side as per wearer hearing performed by the inventor of the present invention, even if the amount of transmission astigmatism added was increased, the degree of satisfaction of the wearer did not change or decreased in some cases. Certainly, due to the addition of positive transmission astigmatism in the present specification (the AS-oriented mode), a clear vision area (e.g., the horizontal width of an area with a transmission astigmatism of 0.5 D or less) is greater than that before the transmission astigmatism is added. However, it is not preferable to endlessly increase the amount of transmission astigmatism added because the transmission astigmatism is added anyway. The plot that the inventor of the present invention conceived in view of this result is a left portion of the plot shown in FIG. 3.

"The predetermined range" is a region extending from a range of ±0.25 D to a range of ±1.25 D centered on the predetermined value, for example. However this predetermined range can be set as appropriate according to the attributes (e.g., race, gender, age, etc.) of the wearer.

With regard to [Setting 2], if the prescription power is somewhat set on the positive side as per wearer hearing performed by the inventor of the present invention, even if the amount of transmission astigmatism added was increased, the degree of satisfaction of the wearer did not change or decreased in some cases. Certainly, due to the addition of negative transmission astigmatism in the present specification (the PW-oriented mode), the horizontal width of an area of the near portion that is larger than or equal to the predetermined power (for example, near power, that is, half of (distance power+addition power)) can be increased as compared with the conventional case. However, it is not preferable to endlessly increase the amount of transmission astigmatism added because the transmission astigmatism is added anyway. The plot that the inventor of the present invention conceived in view of this result is a right portion of the plot shown in FIG. 3.

[Setting 3] is the content that reflects the results of studies conducted by the inventor of the present invention. Specifically, according to the results of the studies, it was found that, if the near power is close to zero, that is, within a predetermined range of ±0.25 D to ±1.25 D centered on zero (i.e., when near power is low), the amount of transmission astigmatism added also greatly affects the degree of satisfaction of the wearer, in addition to switching between the AS-oriented mode and the PW-oriented mode. This [Setting 3] was made based on this finding.

Specifically, in a case where the prescription power is within the predetermined range that includes the predetermined value, first, Y is set to zero (Y=0) when the prescription power has the predetermined value. The reasons therefor are the same as the reasons described in a case where the prescription power is equal to the predetermined value. In particular, in FIG. 3, it is preferable that the predetermined value is set to zero and the plot passes through the origin because the near power is adopted as the prescription power.

Also, in the plot in the present embodiment, the prescription power continuously changes with respect to the plot that is deviated from the predetermined range. That is, the plots set in [Setting 1] and [Setting 2] are continuously connected by the plot set in [Setting 3].

Figure 6:
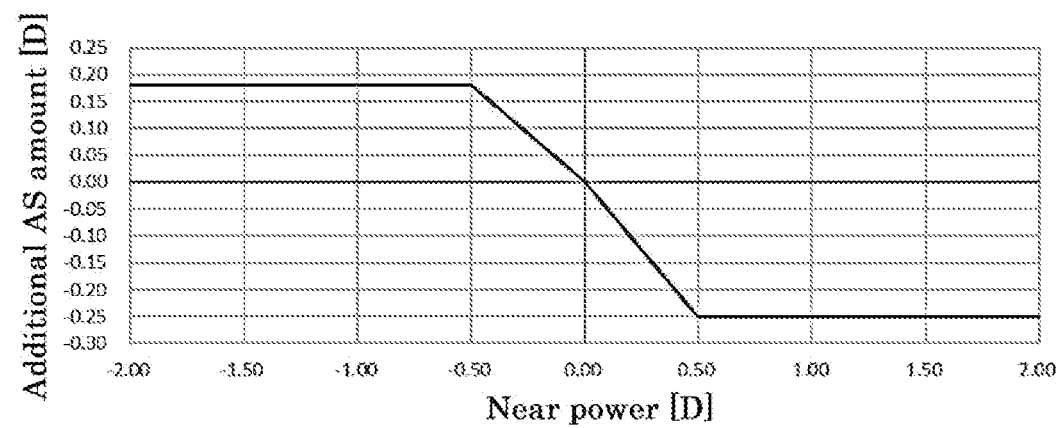
FIG. 6 is a modification example of FIG. 3, and shows a continuous plot obtained by connecting a plot that is obtained when the prescription power deviates from the predetermined range that includes the predetermined value in the negative direction, and a plot that is obtained when the prescription power deviates from the predetermined range that includes the predetermined value in the positive direction, using a straight line.

FIG. 6 is a modification example of FIG. 3 and shows a continuous plot obtained by connecting a plot that is obtained when the prescription power deviates from the predetermined range that includes the predetermined value in the negative direction, and a plot that is obtained when the prescription power deviates from the predetermined range that includes the predetermined value in the positive direction, using a straight line. With regard to a continuous plot, the amount of transmission astigmatism added can be finely set for a wearer for which the prescription power is within the predetermined range, and thus the degree of satisfaction can be improved.

As shown in FIG. 3, "continuously" also includes a situation in which plots are connected to each other by a smooth curve. The plot shown in FIG. 3 is expressed by the following equation.

when $X<-0.50$ holds true, $Y=0.18$ when $-0.50<X<0$ holds true, $Y=-((-0.300 \times X+0.420)\times X+0.645)\times X$ when $0<X<0.50$ holds true, $Y=-((-1.420 \times X+0.420)\times X+0.645)\times X$, and when $X>-0.50$ holds true, $Y=-0.25$ Also, although the plots pass through the origins in FIGS. 3 and 6, the plots are not limited to passing through the origin.

Figure 7:
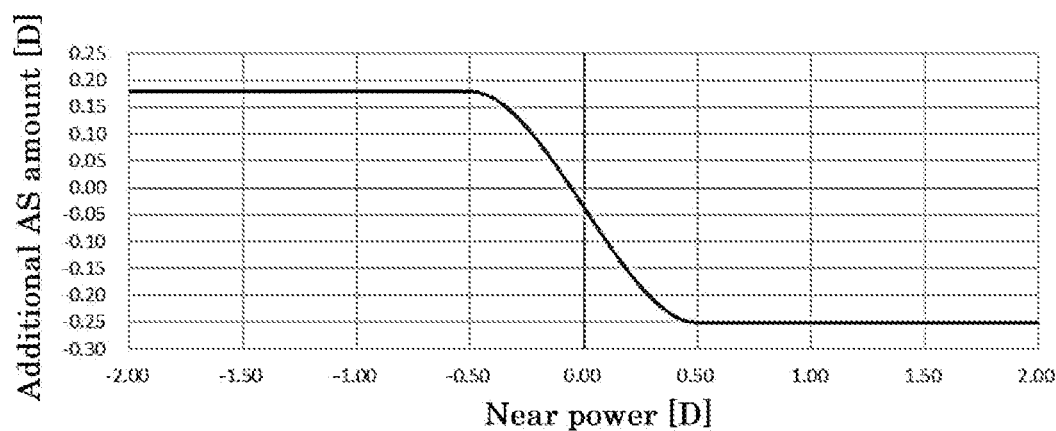
FIG. 7 is a modification example of FIG. 3, and shows a plot that does not pass through the origin in the predetermined range that includes the predetermined value.

FIG. 7 is a modification example of FIG. 3, and shows the plot that does not pass through the origin in the predetermined range that includes the predetermined value.

Also, the plot used in the mode selection step is not limited to a continuous plot.

Figure 8:
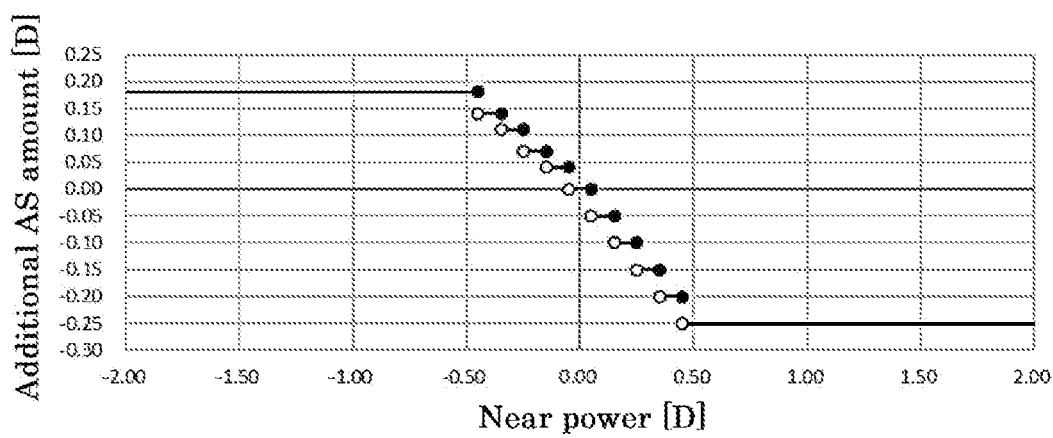
FIG. 8 is a modification example of FIG. 3, and shows a plot obtained by discontinuously connecting a plot that is obtained when the prescription power deviates from the predetermined range that includes the predetermined value in the negative direction, and a plot that is obtained when the prescription power deviates from the predetermined range that includes the predetermined value in the positive direction.

FIG. 8 is a modification example of FIG. 3, and shows a plot obtained by discontinuously connecting a plot that is obtained when the prescription power deviates from the predetermined range that includes the predetermined value in the negative direction, and a plot that is obtained when the prescription power deviates from the predetermined range that includes the predetermined value in the positive direction. White circles do not include values on the horizontal axis, and black circles include values on the horizontal axis in FIG. 8.

Although the predetermined range that includes zero is set to ±0.50 D in the aforementioned examples, obviously, other ranges may be adopted.

Figure 9:
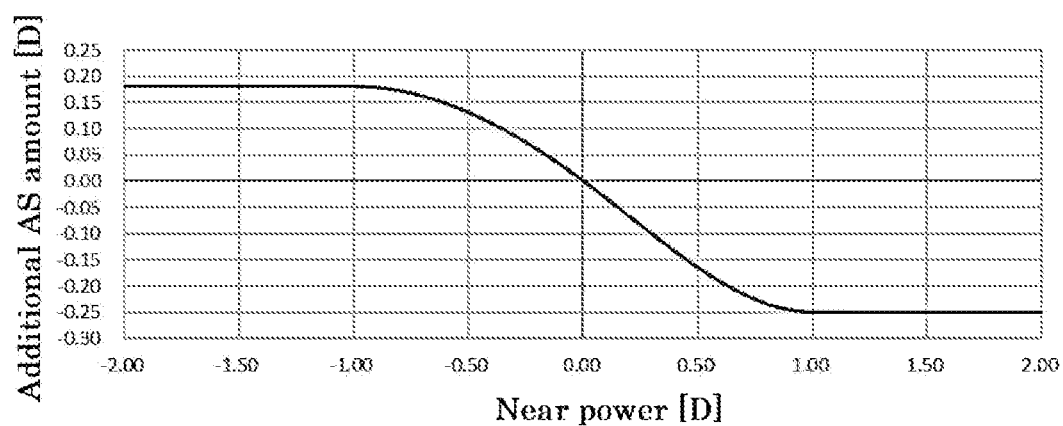
FIG. 9 is a modification example of FIG. 3, and shows a plot when the predetermined range that includes zero is set to ±1.00 D.

FIG. 9 is a modification example of FIG. 3, and shows a plot when the predetermined range that includes zero is set to ±1.00 D.

As described above, examples of the plots used in the mode selection step are shown in FIGS. 3 to 9. The content of each diagram is summarized in Table 1 below.

TABLE 1

| | Horizontal axis | Predetermined range | Does plot pass through origin? | Shape of plot | Normalization performed? |
|---|---|---|---|---|---|
| FIG. 3 | Near power | ±0.25 D | Yes | Curve | No |
| FIG. 4 | Near power | ±0.25 D | Yes | Curve | Yes |
| FIG. 5 | Distance power | ±0.25 D | Yes | Curve | No |
| FIG. 6 | Near power | ±0.25 D | Yes | Straight | No |
| FIG. 7 | Near power | ±0.25 D | No | Curve | No |
| FIG. 8 | Near power | ±0.25 D | Yes | Discontinuous | No |
| FIG. 9 | Near power | ±1.00 D | Yes | Curve | No |

Other preferred aspects according to the progressive addition lens are as follows.

In one aspect of the present invention, the portion where the transmission astigmatism is intentionally added and the spectacle wearer frequently moves their line of sight through is the intermediate portion and the near portion. More precisely, the transmission astigmatism is not added to a fitting point or an eye point FP existing at least in the distance portion. Specifically, definitions will be provided in [Definition], which will be described later. However, as mentioned in [Modification Examples], which will be described later, the addition of the transmission astigmatism to the distance portion is not excluded.

By adding transmission astigmatism in this manner, obviously, the transmission astigmatism is increased at the meridian and the measurement reference point N. However, a sharp change in the transmission astigmatism is mitigated in the entire intermediate portion and near portion. Thus, as a result, a clear visual field can be acquired over a relatively large area.

It is preferable that transmission astigmatism having an absolute value of more than zero and 0.25 D or less is added to the near portion and the intermediate portion. Note that, as shown in the results of tests of subjective evaluation described in the basic application, the addition of transmission astigmatism with at least 0.75 D or less is allowed.

Also, the absolute value of the value of the transmission astigmatism at the measurement reference point F of the distance portion after subtracting the refractive power for astigmatism correction is preferably 0.12 D or less. That is, because the transmission astigmatism is not added to the distance portion, the absolute value of the transmission astigmatism is low, and furthermore, even if the transmission astigmatism is added to the intermediate portion and the near portion, it is possible to acquire a clear visual field range.

The addition power ADD of the progressive addition lens according to the present embodiment is not particularly limited. However, the transmission astigmatism is likely to increase when the addition power ADD is high (e.g., in a range of 1.5 to 3.0 D), but there is a big advantage in that a visual field range that is clearer than a conventional design can be acquired by applying the present embodiment even if the addition power ADD is set high.

Incidentally, when the lens is viewed from top to bottom, it is preferable that the amount of transmission astigmatism added is not substantially reduced once the addition of the transmission astigmatism has started. That is, the additional amount increases to the peripheral edge of the lens, increases to a predetermined additional amount, and then becomes a fixed additional amount. In other words, when the lens is viewed from top to bottom, the additional amount increases monotonically once the addition of the transmission astigmatism has started, and the monotonously increased additional amount does not decrease or is 10% or less of the additional amount or is 0.12 D or less even if the monotonously increased additional amount decreases. Note that, in view of the possibility of the additional amount at the peripheral edge of the lens changing due to lens processing and the additional amount decreasing when the additional amount at the peripheral edge of the lens changes, it is also preferable to apply the following specifications.

In the "at least from the progressive start point to the measurement reference point N (in the case of the meridian, up to the intersecting horizontal line), the additional amount increases monotonically once the addition of the transmission astigmatism has started, and the monotonously increased additional amount does not decrease or it is 10% or less of the additional amount or is 0.12 D or less even if the monotonously increased additional amount decreases".

The addition of the transmission astigmatism causes a change in the transmission refractive power. The average refractive power is represented by spherical refractive power+cylindrical power/2. In the case of the AS-oriented mode in which the transmission astigmatism is added by reducing the vertical refractive power, for example, the average refractive power decreases due to a reduction in the value of cylindrical power in the above-described equation for the average refractive power in the vertical direction. This means that a value lower than the addition power of the prescription value is obtained as the addition power. A change in the transmission refractive power due to the addition of the transmission astigmatism may occur in the PW-oriented mode.

In view of this, in the present embodiment, the transmission refractive power (positive or negative) is added together with the transmission astigmatism so as to compensate for the change in the refractive power accompanying the addition of the transmission astigmatism and to realize the planned addition power. The additional amount of the transmission refractive power may be determined according to a difference in the refractive power and the planned addition power.

A specific example of adding the transmission refractive power together with the transmission astigmatism is as follows. The amount of the transmission astigmatism to be added may be determined in advance. A lens design that takes the change in the refractive power accompanying the addition of the transmission astigmatism into consideration is prepared. By adding the predetermined transmission astigmatism to the lens design, settings may be made so that a target addition power can be obtained.

Note that in the progressive addition lens to which the transmission astigmatism is added, at the measurement reference point N of the near portion, if a value of distance power S+addition power ADD described on a lens bag or the like due to the change in the refractive power by the addition, that is, the deviation from the near power is partially compensated, it is considered that the addition of the transmission refractive power is performed. As an example, in the state in which the deviation is finally not present in the progressive addition lens or the state in which the deviation amount is within ±0.12 D even if the deviation is present, it is considered that the addition of the transmission refractive power is performed.

The absolute value of a change amount Δ[D] from the value of transmission astigmatism at the measurement reference point F of the distance portion to the value of transmission astigmatism at the measurement reference point N of the near portion is 0.07 to 0.24 times the addition power ADD [D]. The absolute value in each of the above-described modification examples falls within this range. Note that the range of the change amount Δ[D] is more preferably 0.10 times to 0.20 times and particularly preferably 0.12 times to 0.15 times the addition power ADD [D].

[Definition]

Hereinafter, the definitions of the terms in the present embodiment will be described below. Note that, although most of the following definitions are described in Patent Document 1, they will be listed here just in case.

In the present specification, generally, as a wording indicating the degree of refraction of a lens, so-called power, and the refractive power is used instead of power.

In the present specification, the terms three kinds of "astigmatism" are used to clarify the difference in meaning.

The first term is "prescription astigmatism". The prescription astigmatism relates to prescription data for correcting eye defects (eye astigmatism) and corresponds to a columnar refractive power of prescription data.

The second term is "intrinsic astigmatism". The intrinsic astigmatism relates to astigmatism caused by a surface shape of an optical lens and has the same meaning as the term "astigmatism" commonly used in the optical lens design. As used in the present specification, the intrinsic astigmatism originally refers to astigmatism that is inherently indispensable due to the surface shape of the progressive addition lens, that is, an aspherical component constituting a progressive surface.

The third term is "additional astigmatism". The additional astigmatism is the main component of the present embodiment, and is the astigmatism intentionally added to the distribution of the transmission astigmatism in addition to the prescription astigmatism (refractive power for astigmatism correction and astigmatism power) when setting the distribution of the transmission target refractive power in the design stage of the progressive addition lens. For convenience of explanation, in the present specification, the additional astigmatism is also referred to as the addition of the transmission astigmatism.

In the present specification, the transmission astigmatism added is the above-mentioned additional astigmatism. The additional astigmatism can be realized by adding the surface astigmatism to at least one of the surface on the object side and the surface on the eyeball side in the progressive addition lens. As a result, the transmission astigmatism is added as the progressive addition lens as a whole.

Note that the expression "transmission refractive power" also refers to a refractive power of the progressive addition lens in which the surface refractive power is added to at least one of the surface on the object side and the surface on the eyeball side.

The transmission astigmatism is the value obtained by subtracting the minimum refractive power from the maximum refractive power at a predetermined location on the progressive addition lens in the wearing state.

In the present specification, the value of the "additional amount of the transmission astigmatism" indicates the maximum value of the transmission astigmatism to be added. That is, the fact that the additional amount of the transmission astigmatism is 0.50 D means that the maximum value is 0.50 D, and is an expression that allows an additional amount to be less than 0.50 D between the beginning portion of the addition of the transmission astigmatism and the arrival portion of the maximum value.

Note that the upper limit and the lower limit of this maximum value need only be determined according to the above-described different parameters (e.g., addition power), and there is no particular limitation thereto. The lower limit is preferably 0.08 D, and more preferably 0.10 D, for example. The upper limit is preferably 0.75 D, and even more preferably 0.50 D.

In the progressive addition lens, the "main line of sight" is a locus line on the lens surface where the line of sight moves when an object is viewed from the front, in the distance portion used for the distance vision, the near portion used for the near vision, and the intermediate portion located between the distance portion and the near portion.

The "meridian" is a vertical line that is orthogonal to a horizontal line connecting positions of two hidden marks provided on the progressive addition lens and passes through a midpoint of the positions of the two hidden marks.

The Y-direction is a direction extending along the meridian and is a vertical direction with respect to the plane view of the optical surface of the lens. The upper side of the lens in the worn state is set as a +Y-direction, and the lower side of the lens is set as a −Y-direction. The X direction is the direction orthogonal to the meridian and is a horizontal direction. When facing the wearer, the right side of the lens is set as a +X-direction and the left side of the lens is set as a −X-direction. The meridian corresponds to the Y-axis.

The line of sight of the eye is closer to a nasal side (inner side) in the near vision. Therefore, the main line of sight in the intermediate portion and near portion is closer to the nasal side (medial side) with respect to the meridian. The amount of main line of sight by the nasal side with respect to such a meridian is called an inward adjustment amount. Therefore, when the inward adjustment amount is 0, the main line of sight matches the meridian. Even in the distance portion, the main line of sight matches the meridian.

In this specification, in order to make the explanation easy to understand, an example of setting the inward adjustment amount to 0 is given at the design stage of the lens. In the present specification, the design stage of the lens is also referred to as a target distribution state. On the other hand, an example is given in which the inward adjustment amount is set to a value larger than 0 for a lens obtained through the design and manufacture of the lens. In the present specification, this state is also referred to as a finally obtained lens state. However, the present invention is not limited to these examples.

The "distance portion measurement reference point" refers to giving the progressive addition lens the spherical refractive power and the columnar refractive power described in the prescription data of the wearer information. The spherical refractive power refers to the so-called spherical power S, and the columnar refractive power refers to the so-called cylindrical power C. The distance portion measurement reference point (hereinafter, also simply referred to as measurement reference point F or point F) is located on, for example, the meridian, and is located at a position 8.0 mm away from the horizontal line connecting the positions of the two hidden marks to the distance portion side.

The "fitting point or eye point (FP)" is the position through which the line of sight passes when facing forward while wearing the progressive addition lens. Generally, it is placed at a position a few mm below the measurement reference point F. The change in the refractive power occurs below this FP. The point at which the change in the progressive power starts is also called the progressive start point. In the present embodiment, a geometric center GC further below the FP and the progressive start point are matched, as well as the prism reference point.

The "transmission astigmatism is not added to the distance portion" means that transmission astigmatism is not added to at least the FP existing in the distance portion. Because off-axis aberration occurs in the lens peripheral area of the distance portion, the aspherical correction may be applied to the lens peripheral area. Therefore, it is not necessary to bring about the state in which the transmission astigmatism is not added to the entire distance portion. Preferably, "transmission astigmatism is not added to the distance portion" means that no transmission astigmatism is added at least between the measurement reference point F and the FP (preferably the GC further down).

The "adding the transmission astigmatism to the intermediate portion and the near portion" means adding the transmission astigmatism to at least a part of the intermediate portion and adding the transmission astigmatism to at least a part of the near portion.

Defining the additional state of the transmission astigmatism as a numerical value indicates a state in which the value increases from the absolute value of the transmission astigmatism at the measurement reference point F of the distance portion to the absolute value of the transmission astigmatism at any point of the intermediate portion or the near portion.

As shown in patterns 1 and 3 of the addition of the transmission astigmatism described in Patent Document 1, the transmission astigmatism is not necessarily added to the entire area below the horizontal line passing through the progressive start point and the geometric center GC.

Further, when the lens is viewed from top to bottom, it is not necessary to start the addition of the transmission astigmatism from directly below the FP, directly below the progressive start point, directly below the GC, or directly below the prism start point. It is sufficient to start the addition of the transmission astigmatism between the progressive start point and the measurement reference point N. The transmission astigmatism may not be added to the portion closer to the distance portion in the intermediate portion, and the transmission astigmatism may be added only to the portion closer to the near portion.

However, it is preferable to add the transmission astigmatism on the main line of sight (and/or meridian) passing through the intermediate portion and the near portion below the portion where the addition of the transmission astigmatism has started. At least, it is preferable to add the transmission astigmatism on the main line of sight from the portion between the progressive start point and the measurement reference point N to the measurement reference point N. In terms of the meridian, it is preferable to add at least the transmission astigmatism on the entire meridian from the portion (for example, within a radius of 5 mm from the GC, preferably within 3 mm) between the progressive start point and the measurement reference point N to the horizontal line intersecting the measurement reference point N. Note that because the FP and the progressive start point normally exist on the meridian (on the Y-axis), the horizontal line is not used, but even if the FP and the progressive start point do not exist on the meridian, by using the horizontal line, it is possible to define the above-described "whole meridian".

The "near portion measurement reference point" refers to a point in which the addition power ADD is added to the spherical refractive power described in the prescription data of the wearer information, and refers to a point in which spherical refractive power+ADD is first realized when the lens is viewed from top to bottom. The near portion measurement reference point (hereinafter, also simply referred to as measurement reference point N or point N) is also located on the meridian.

Also, the prescription data of the wearer information is written on the lens bag of the progressive addition lens. That is, if there is a lens bag, it is possible to specify the lens as being a progressive addition lens based on the prescription data of the wearer information. The progressive addition lens and the lens bag are usually provided as a set. Therefore, the progressive addition lens group to which the lens bag is attached also reflects the technical idea of the present invention, and the same applies to a group of sets of lens bags and the progressive addition lenses.

In addition, the positions of measurement reference point F, the fitting point or the eye point FP, and the measurement reference point N can be specified by referring to a remark chart or a centration chart issued by the lens manufacturer.

Further, in the transmission distribution of the transmission average refractive power or the transmission astigmatism, the location on the transmission distribution corresponding to the distance portion defined on the lens surface is expressed as "the portion corresponding to the distance portion". For convenience of explanation, the "portion corresponding to the distance portion" is also simply expressed as the "distance portion". Unless otherwise specified, the "distance portion" refers to the above-described "portion corresponding to the distance portion".

Note that the distance portion is not particularly limited as long as it is an area for viewing a distance farther than the near distance. It may be an area for viewing a predetermined distance (about 1 m) instead of infinity, for example. Examples of a spectacle lens provided with such an area include an intermediate-near lens corresponding to an object distance of an intermediate distance (1 m to 40 cm) to a near distance (40 cm to 10 cm) and a corresponding near-near lens within the near distance.

In any of the above-described spectacle lenses, the intermediate portion and the near portion include an astigmatism adjustment area in which the surface shapes of the near portion and the intermediate portion are adjusted. Of the distribution of the transmission astigmatism generated by light rays transmitted through this spectacle lens, the positions of the maximum refractive power in the intermediate portion and the near portion are approximately the same positions in the horizontal direction. That is, the position of the maximum refractive power in the intermediate portion and the near portion has substantially the same value on the X-axis in terms of coordinates.

The "position of the maximum refractive power" is a position where the horizontal refractive power and the vertical refractive power orthogonal to the horizontal direction each are the maximum refractive powers. The fact that the position of the maximum refractive power where the horizontal refractive power and the vertical refractive power are the maximum refractive power are substantially the same means that the case where the horizontal refractive power and the vertical refractive power are separated within 2 mm is included as an allowable range.

The difference between the maximum refractive power in the horizontal direction and the maximum refractive power in the vertical direction in the intermediate portion and the near portion is different from the difference between the horizontal refractive power and the vertical refractive power at the point corresponding to the distance portion measurement reference point. The absolute value of the difference is preferably 0.25 D or less.

Note that it is preferable that the difference in the maximum refractive power is different from the difference between the horizontal refractive power and the vertical refractive power at a point corresponding to the distance portion measurement reference point even in the location corresponding to the location along the meridian in the astigmatism adjustment area.

"In the near portion and the intermediate portion to which the transmission astigmatism is added, including the portion where the amount of horizontal refractive power is larger than the amount of vertical refractive power" in the AS-oriented mode means that in at least a part of the portion where the transmission astigmatism is added in the near portion and the intermediate portion, after subtracting the refractive power for astigmatism correction, the amount of horizontal refractive power is larger than the amount of vertical refractive power. Obviously, in the portion where the transmission astigmatism is added, the amount of horizontal refractive power may always be larger than the amount of vertical refractive power. Also, in the near portion and the intermediate portion, at least on the main line of sight (and/or meridian) (preferably at least from the progressive start point to the measurement reference point N), it is preferable that the amount of horizontal refractive power is larger than the amount of vertical refractive power.

Note that "in the near portion and the intermediate portion to which the transmission astigmatism is added, including the portion where the amount of vertical refractive power is larger than the amount of horizontal refractive power" in the PW-oriented mode refers to the content in which horizontal and vertical are reversed in the content described in this paragraph.

MODIFICATION EXAMPLE

One aspect of the present invention has been described in detail above, but the progressive addition lens of the present invention and the method for designing the same are not limited to the above-described embodiment and may be variously improved and changed without departing from the gist of the present invention. Also, it goes without saying that the preferred examples described in the present specification may be applied to each of the following aspects.

The method for manufacturing a progressive addition lens in which the method for designing the progressive addition lens is utilized also reflects the technical idea of the present invention. It is sufficient to adopt a known method as a specific manufacturing method, and to utilize the spectacle lens manufacturing system described in [0378] and onward in Patent Document 1.

Also, the system for designing a progressive addition lens in which the method for designing the progressive addition lens is utilized also reflects the technical idea of the present invention.

Specifically, the system for designing a progressive addition lens reflects the technical idea of the present invention, the lens including: a near portion for viewing a near distance; a distance portion for viewing a distance farther than the near distance; and an intermediate portion provided between the near portion and the distance portion and having a progressive refraction function, in which transmission astigmatism is added to the near portion and the intermediate portion out of the distance portion, the near portion, and the intermediate portion, the system comprising a mode selection unit configured to determine, according to a prescription power, whether to select an AS-oriented mode in which the amount of transmission astigmatism to be added is set such that the amount of horizontal refractive power is larger than the amount of vertical refractive power, or select a PW-oriented mode in which the amount of transmission astigmatism to be added is set such that the amount of vertical refractive power is larger than the amount of horizontal refractive power.

It is sufficient to utilize the spectacle lens manufacturing system described in and onward in Patent Document 1 as the configuration of this designing system. Also, the mode selection unit may be provided in a computer on the lens manufacturer side or a computer on the optician side described in FIG. 24 in Patent Document 1, and a control unit need only perform control such that the computer functions as the mode selection unit. Therefore, the technical idea of the present invention is also applicable to a program that causes the computer to function as the mode selection unit.

A progressive addition lens group produced based on the technical idea of the present invention, that is, a group that includes the progressive addition lens produced in the AS-oriented mode and the progressive addition lens produced in the PW-oriented mode also has large technical characteristics.

Specifically, the progressive addition lens group includes a near portion for viewing a near distance, a distance portion for viewing a distance farther than the near distance, and an intermediate portion provided between the near portion and the distance portion and having a progressive refraction function, in which transmission astigmatism is added to the near portion and the intermediate portion out of the distance portion, the near portion, and the intermediate portion, according to a prescription power, the amount of transmission astigmatism to be added is set such that the amount of horizontal refractive power is larger than the amount of vertical refractive power, and the amount of transmission astigmatism to be added is set such that the amount of vertical refractive power is larger than the amount of horizontal refractive power.

Also, there is no limitation on how to add the transmission astigmatism. The transmission astigmatism may be added along the meridian and/or main line of sight. Also, at least a portion of a design surface may be enlarged around the meridian and/or main line of sight. A pattern may be adopted in which the astigmatism adjustment area R (see FIG. 2 in Patent Document 1) of the progressive addition lens is located below the horizontal line HL (see FIG. 2), and is a fan-shaped area that further extends downward, for example (Pattern 1 in Patent Document 1, [0283] to [0302]).

Also, a pattern may be adopted in which the astigmatism adjustment area R of the progressive addition lens is located below the horizontal line HL (Pattern 2 in the basic application, [0303] to [0319]).

Furthermore, a case may be adopted in which the astigmatism adjustment area R of the progressive addition lens includes an area that is located below the horizontal line HL and has a fixed width in the horizontal direction (Pattern 3 in the basic application, [0320] to [0337]).

<Summary>

The following is a summary of the "method for designing a progressive addition lens, system for designing a progressive addition lens, and a progressive addition lens group" disclosed in this disclosure.

An embodiment of the present disclosure is as follows.

A method for designing a progressive addition lens, the lens including a near portion for viewing a near distance, a distance portion for viewing a distance farther than the near distance, and an intermediate portion provided between the near portion and the distance portion and having a progressive refraction function, in which transmission astigmatism is added to the near portion and the intermediate portion out of the distance portion, the near portion, and the intermediate portion, the method comprising a mode selection step of determining, according to a prescription power, whether to select an AS-oriented mode in which the amount of transmission astigmatism to be added is set such that the amount of horizontal refractive power is larger than the amount of vertical refractive power, or select a PW-oriented mode in which the amount of transmission astigmatism to be added is set such that the amount of vertical refractive power is larger than the amount of horizontal refractive power.

The invention claimed is:

1. A method for designing a progressive addition lens, the progressive addition lens including a near portion for viewing a near distance, a distance portion for viewing a distance farther than the near distance, and an intermediate portion provided between the near portion and the distance portion and having a progressive refraction function, wherein transmission astigmatism is added to the near portion and the intermediate portion out of the distance portion, the near portion, and the intermediate portion, the method comprising a mode selection step of determining, according to a prescription power, whether to:

select an AS-oriented mode in which the amount of transmission astigmatism to be added is set such that the amount of horizontal refractive power is larger than the amount of vertical refractive power, or select a PW-oriented mode in which the amount of transmission astigmatism to be added is set such that the amount of vertical refractive power is larger than the amount of horizontal refractive power;

wherein in the mode selection step, in a case where the prescription power is lower than a predetermined value, the AS-oriented mode is selected, and in a case where the prescription power is higher than the predetermined value, the PW-oriented mode is selected;

wherein the mode selection step is performed based on a plot obtained when the prescription power [D] is shown on a horizontal axis X (a positive direction indicates positive power and a negative direction indicates negative power), the amount of transmission astigmatism added [D] is shown on a vertical axis Y (a positive direction indicates the amount of transmission astigmatism obtained when the amount of horizontal refractive power is larger than the amount of vertical refractive power, and a negative direction indicates the amount of transmission astigmatism obtained when the amount of vertical refractive power is larger than the amount of horizontal refractive power), and the origin is set such that the prescription power is zero and the amount of transmission astigmatism added is zero, on the plot, in a case where the prescription power deviates from a predetermined range that includes the predetermined value in the negative direction, the AS-oriented mode is selected and the amount of transmission astigmatism added is kept constant in the positive direction, in a case where the prescription power deviates from the predetermined range that includes the predetermined value in the positive direction, the PW-oriented mode is selected and the amount of transmission astigmatism added is kept constant in the negative direction, and in a case where the prescription power is within the predetermined range that includes the predetermined value, Y is set to zero (Y=0) when the prescription power has the predetermined value and the prescription power continuously changes with respect to the plot that is deviated from the predetermined range.

2. The method for designing a progressive addition lens according to claim 1, wherein the prescription power is a near power obtained by adding an addition power to a distance power, the predetermined value is zero, and the predetermined range is a region extending from a range of ±0.25 D to a range of ±1.25 D centered on the predetermined value.

3. A system for designing a progressive addition lens, the progressive addition lens including a near portion for viewing a near distance, a distance portion for viewing a distance farther than the near distance, and an intermediate portion provided between the near portion and the distance portion and having a progressive refraction function, wherein transmission astigmatism is added to the near portion and the intermediate portion out of the distance portion, the near portion, and the intermediate portion, the system comprising a mode selection unit configured to perform a mode selection step of determining, according to a prescription power, whether to:

select an AS-oriented mode in which the amount of transmission astigmatism to be added is set such that the amount of horizontal refractive power is larger than the amount of vertical refractive power, or select a PW-oriented mode in which the amount of transmission astigmatism to be added is set such that the amount of vertical refractive power is larger than the amount of horizontal refractive power;

wherein in the mode selection step,
in a case where the prescription power is lower than a predetermined value, the AS-oriented mode is selected, and
in a case where the prescription power is higher than the predetermined value, the PW-oriented mode is selected;

wherein the mode selection unit performs the mode selection step based on a plot obtained when the prescription power [D] is shown on a horizontal axis X (a positive direction indicates positive power and a negative direction indicates negative power), the amount of transmission astigmatism added [D] is shown on a vertical axis Y (a positive direction indicates the amount of transmission astigmatism obtained when the amount of horizontal refractive power is larger than the amount of vertical refractive power, and a negative direction indicates the amount of transmission astigmatism obtained when the amount of vertical refractive power is larger than the amount of horizontal refractive power), and the origin is set such that the prescription power is zero and the amount of transmission astigmatism added is zero, on the plot,
in a case where the prescription power deviates from a predetermined range that includes the predetermined value in the negative direction, the AS-oriented mode is selected and the amount of transmission astigmatism added is kept constant in the positive direction,
in a case where the prescription power deviates from the predetermined range that includes the predetermined value in the positive direction, the PW-oriented mode is selected and the amount of transmission astigmatism added is kept constant in the negative direction, and
in a case where the prescription power is within the predetermined range that includes the predetermined value, Y is set to zero (Y=0) when the prescription power has the predetermined value and the prescription power continuously changes with respect to the plot that is deviated from the predetermined range.

* * * * *